US012438591B2

United States Patent
Huang et al.

(10) Patent No.: US 12,438,591 B2
(45) Date of Patent: Oct. 7, 2025

(54) ASSISTANCE INFORMATION FOR BEAM MAPPING ACROSS DIFFERENT REMOTE RADIO HEADS

(71) Applicant: QUALCOMM Incorporated, San Diego, CA (US)

(72) Inventors: Chu-Hsiang Huang, San Diego, CA (US); Ruhua He, San Diego, CA (US); Yan Zhou, San Diego, CA (US); Muhammad Sayed Khairy Abdelghaffar, San Jose, CA (US); Ting Kong, San Diego, CA (US); Mihir Vijay Laghate, San Diego, CA (US); Rahul Malik, San Diego, CA (US); Yong Li, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 360 days.

(21) Appl. No.: 17/874,000

(22) Filed: Jul. 26, 2022

(65) Prior Publication Data
US 2023/0037644 A1    Feb. 9, 2023

Related U.S. Application Data

(60) Provisional application No. 63/230,052, filed on Aug. 5, 2021.

(51) Int. Cl.
*H04W 72/51* (2023.01)
*H04W 72/044* (2023.01)

(52) U.S. Cl.
CPC ........ *H04W 72/51* (2023.01); *H04W 72/046* (2013.01)

(58) Field of Classification Search
CPC .......................... H04W 72/51; H04W 72/046
USPC ........................................................ 370/329
See application file for complete search history.

(56) References Cited

U.S. PATENT DOCUMENTS

| | | |
|---|---|---|
| 2018/0014208 A1 | 1/2018 | Guo et al. |
| 2020/0351055 A1 | 11/2020 | Manolakos et al. |
| 2020/0404638 A1 | 12/2020 | Deogun et al. |
| 2021/0258940 A1* | 8/2021 | Kim ...................... H04L 5/0023 |
| 2023/0020735 A1* | 1/2023 | Matsumura .......... H04B 7/0695 |
| 2023/0189012 A1* | 6/2023 | Niu ......................... H04W 4/44 |
| | | 455/446 |
| 2023/0189320 A1* | 6/2023 | Matsumura ........... H04L 5/0053 |
| | | 370/329 |
| 2023/0396388 A1* | 12/2023 | Huang ................ H04L 25/0222 |

(Continued)

OTHER PUBLICATIONS

Nokia, Email discussion summary for [101bis-e][204] NR_HST_FR2_RRM_1, 3GPP TSG-RAN WG4 Meeting # 101-bis-e R4-210XXXX Electronic Meeting, Jan. 17-25, 2022 (Year: 2022).*

(Continued)

*Primary Examiner* — Christopher B Robinson
*Assistant Examiner* — Chong G Kim
(74) *Attorney, Agent, or Firm* — Dinsmore & Shohl LLP

(57) ABSTRACT

Certain aspects of the present disclosure provide a method for wireless communications by a user equipment (UE), generally including receiving assistance information, from a network entity, indicating a mapping between beams across different remote radio heads (RRHs) and using the assistance information to perform beam management when the UE is moving from the coverage area of one RRH to the coverage area of another RRH.

30 Claims, 10 Drawing Sheets

(56) References Cited

U.S. PATENT DOCUMENTS

| | | | |
|---|---|---|---|
| 2024/0007872 A1* | 1/2024 | Hu | H04W 36/085 |
| 2024/0267175 A1* | 8/2024 | Matsumura | H04L 5/0035 |
| 2024/0323781 A1* | 9/2024 | Chapman | H04W 36/30 |

OTHER PUBLICATIONS

International Search Report and Written Opinion—PCT/US2022/038447—ISA/EPO—Oct. 26, 2022.

\* cited by examiner

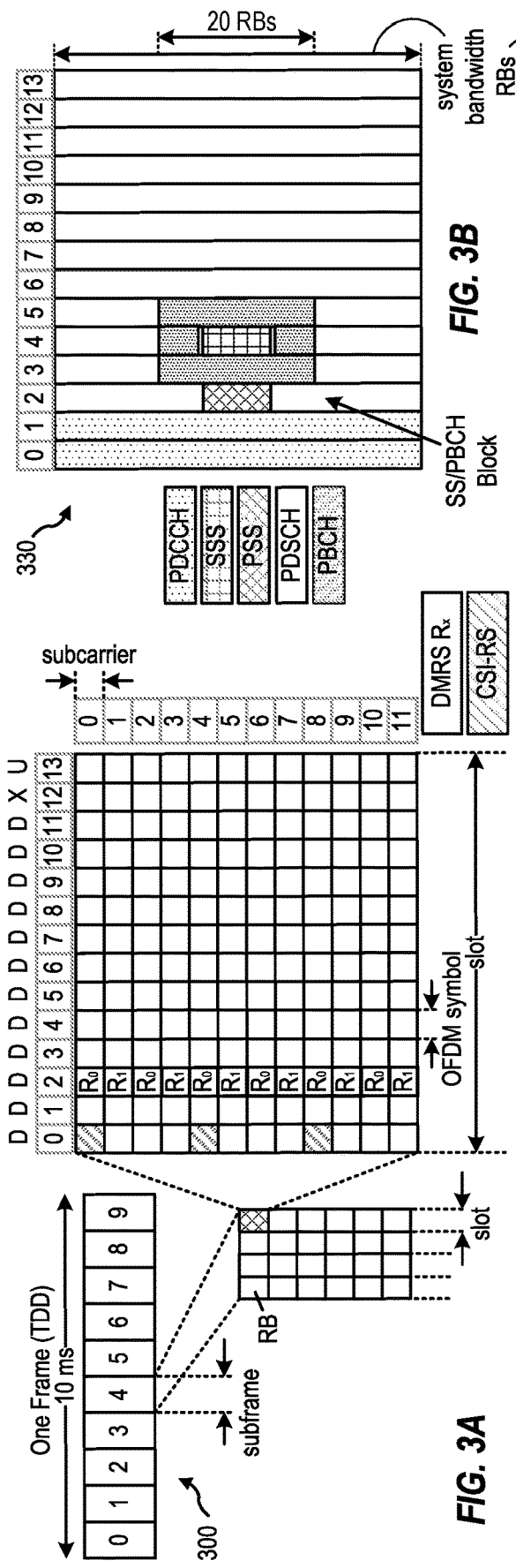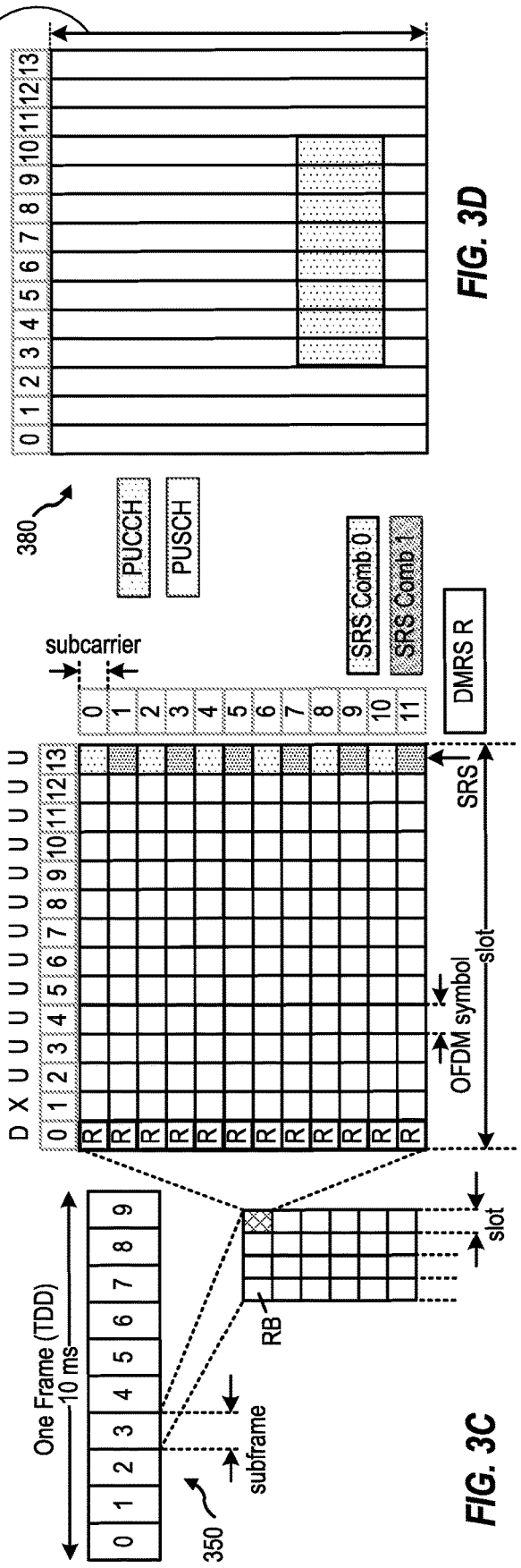

| RRH1 | RRH2 |
|---|---|
| 1 | 5 |
| 2 | 6 |
| 3 | 7 |
| 4 | 8 |

ASSISTANCE INFORMATION FOR BEAM MAPPING ACROSS DIFFERENT REMOTE RADIO HEADS

CROSS REFERNCE TO RELATED APPLICATIONS

This application claims benefits of and priority to U.S. Provisional Patent Application No. 63/230,052, filed on Aug. 5, 2021, which is assigned to the assignee hereof and herein incorporated by reference in the entirety as if fully set forth below and for all applicable purposes.

INTRODUCTION

Aspects of the present disclosure relate to wireless communications, and more particularly, to techniques for using assistance information to enhance beam management when moving between remote radio heads (RRHs).

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes receiving assistance information, from a network entity, indicating a mapping between beams across different remote radio heads (RRHs); and using the assistance information to perform beam management when the UE is moving from the coverage area of one RRH to the coverage area of another RRH.

In one aspect, a method for wireless communications by a network entity includes determining beams across different RRHs that have same or similar QCL properties; and transmitting assistance information to a UE indicating a mapping between the beams across different RRHs that have same or similar quasi co-location (QCL) properties.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

DETAILED DESCRIPTION

Aspects of the present disclosure provide apparatuses, methods, processing systems, and computer-readable mediums for using assistance information to enhance beam management when moving between remote radio heads (RRHs).

An RRH generally refers to a radio transceiver that connects to radio base station unit via electrical or wireless interface. The RRH is referred to as remote because it is usually installed in a location (e.g., on top of a mast or tower) that is physically some distance away from base station hardware (which is often rack-mounted indoors). In LTE and NR, RRHs are used to extend the coverage of a base station (eNB/gNB). RRHs are generally connected to the base station via a wired (e.g., fiber optic cable) or wireless connection.

One use case for RRHs is in a high speed train (HST) scenario, in which a UE moves on a track in a known (e.g., almost fixed) direction. RRHs may be uniformly deployed along the track and the variation of distances among RRHs and between RRHs and the track may be fairly small. Despite this rather controlled deployment environment, a UE moving from the coverage of one RRH to another may still perform conventional beam management, with relatively lengthy beam discovery and neighboring cell detection procedures.

Aspects of the present disclosure propose using knowledge about RRH beam direction as assistance information to enhance beam management in an HST scenario. For example, the assistance information may indicating a mapping between beams of adjacent RRHs. As a UE moves between RRHs, using this beam mapping may help the UE speed up beam discovery and neighboring cell detection by reducing Rx beam sweeping delay.

Introduction to Wireless Communication Networks

Figure 1:
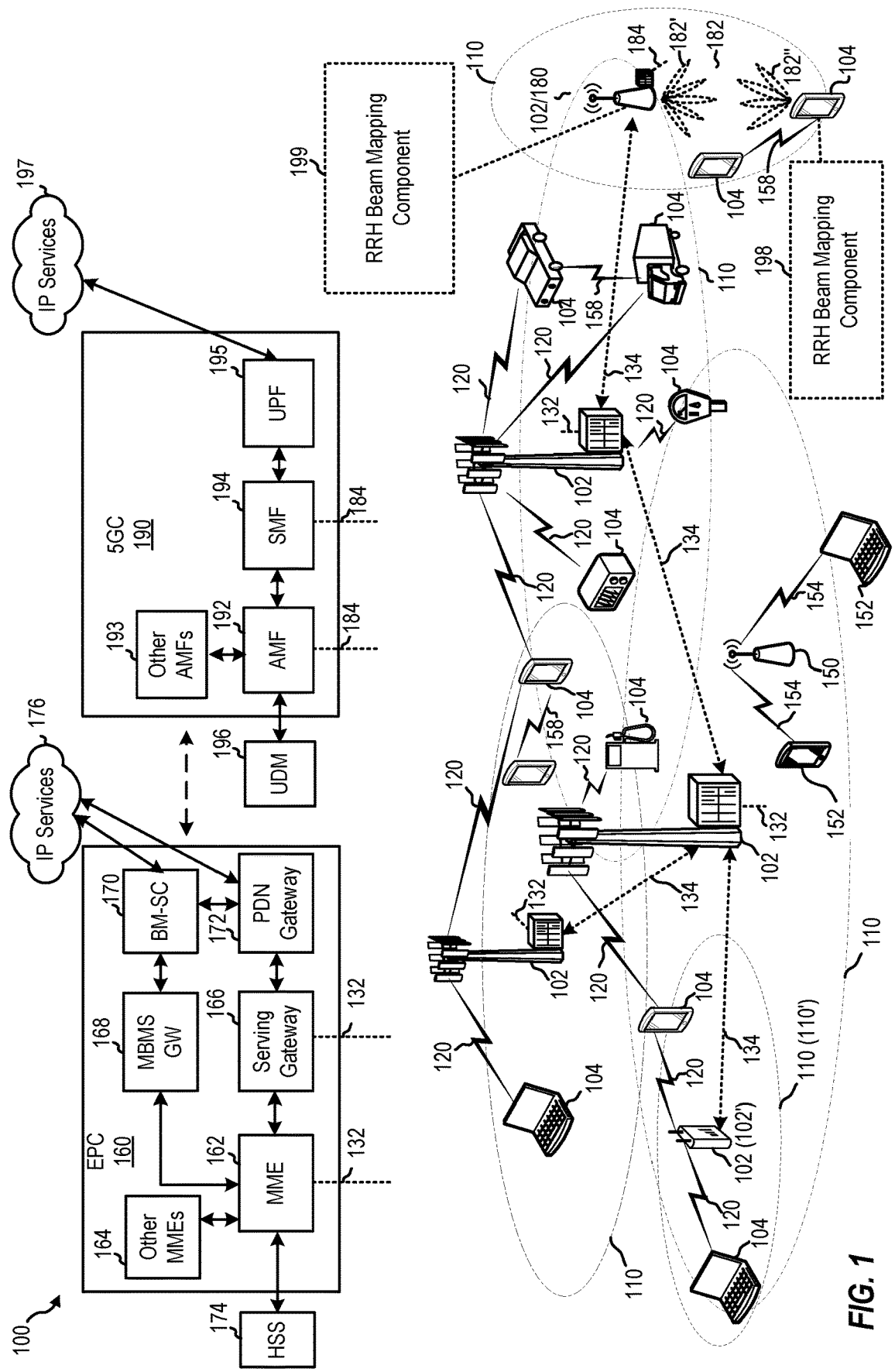
FIG. 1 is a block diagram conceptually illustrating an example wireless communication network.

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless communication network 100 includes an RRH beam mapping component 199, which may be configured to share RRH beam mapping information with a UE. Wireless network 100 further includes RRH beam mapping component 198, which may be used to perform enhanced beam management when moving between RRHs.

FIG. 1 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Base station 102 includes controller/processor 240, which may be configured to implement various functions related to wireless communications. In the depicted example, controller/processor 240 includes RRH beam mapping component 241, which may be representative of RRH beam mapping component 199 of FIG. 1. Notably, while depicted as an aspect of controller/processor 240, RRH beam mapping component 241 may be implemented additionally or alternatively in various other aspects of base station 102 in other implementations.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes RRH beam mapping component 281, which may be representative of RRH beam mapping component 198 of FIG. 1. Notably, while depicted as an aspect of controller/processor 280, RRH beam mapping component 281 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Introduction to mmWave Wireless Communications

In wireless communications, an electromagnetic spectrum is often subdivided, into various classes, bands, channels, or other features. The subdivision is often provided based on wavelength and frequency, where frequency may also be referred to as a carrier, a subcarrier, a frequency channel, a tone, or a subband.

In 5G, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is sometimes referred to (interchangeably) as a "millimeter wave" ("mmW" or "mmWave") band in documents and articles, despite being different from the extremely high frequency (EHF) band (30 GHz-300 GHz), which is identified by the International Telecommunications Union (ITU) as a "millimeter wave" band because wavelengths at these frequencies are between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

Communications using the mmWave/near mmWave radio frequency band (e.g., 3 GHz-300 GHz) may have higher path loss and a shorter range compared to lower frequency communications. Accordingly, in FIG. 1, mmWave base station 180 may utilize beamforming 182 with the UE 104 to improve path loss and range. To do so, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Aspects Related to Using Assistance Information for Beam Mapping Across Different RRHs Aspects of the present disclosure propose using knowledge about RRH beam direction as assistance information to enhance beam management in an HST scenario. The assistance information may indicating a mapping between beams of adjacent RRHs that a UE may use to speed up beam discovery, neighboring cell detection, beam refinement, and/or beam switching by reducing Rx beam sweeping delay.

Figures 4A, 4B:
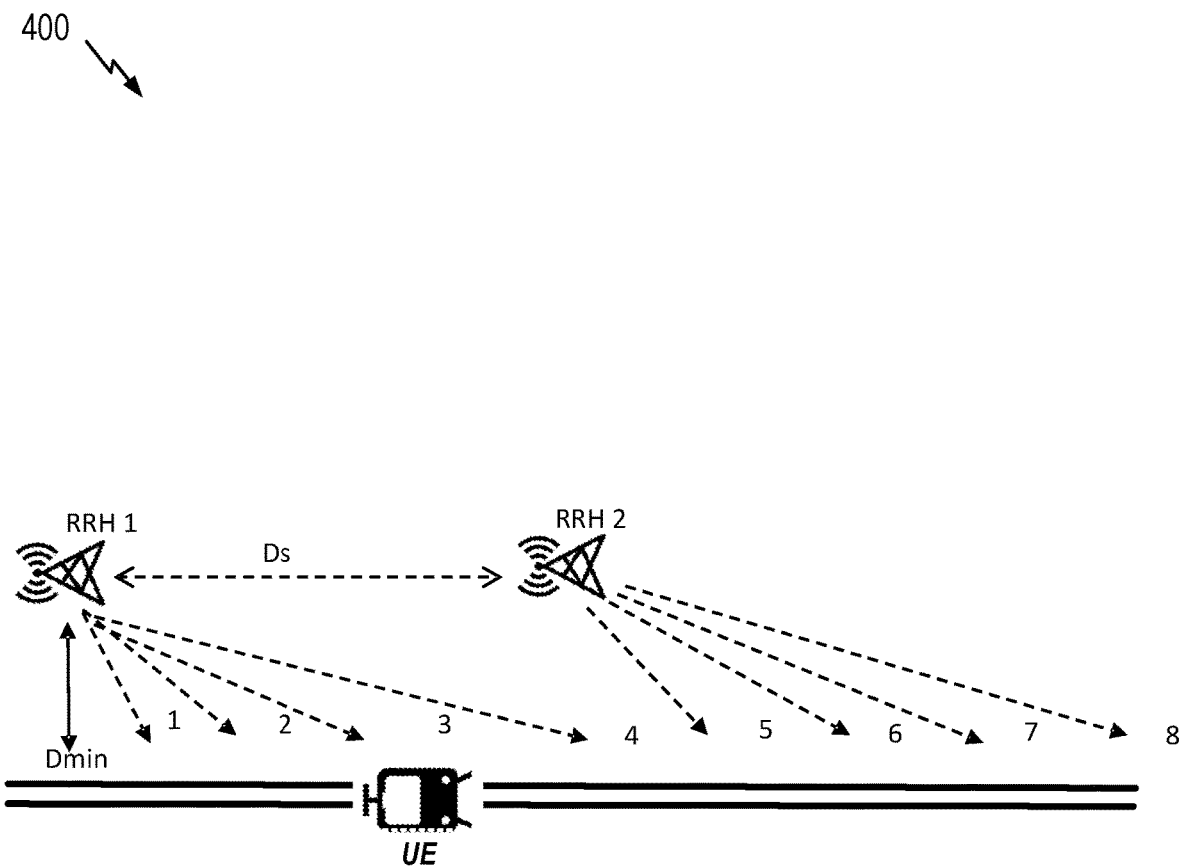
FIGS. 4A and 4B depict an example high speed train (HST) deployment and beam mapping table, according to aspects of the present disclosure.

As illustrated in FIG. 4A, in an HST scenario, a UE (e.g., located in or on a train car) moves on the track with an almost fixed direction. As noted above, the RRHs (e.g., RRH1 and RRH2) may be uniformly deployed across the railways and the variation of distances ($D_S$) among RRHs and distances ($D_{min}$) between RRHs and the track may be relatively small.

Therefore, as illustrated in FIG. 4A, RRHs may be able to use (essentially) the same set of beams (from beam peak direction perspective) to cover their serving region. For example, the four beams from RRH1 (Beams 1-4) may be the same (virtually identical) or similar to the four beams (Beams 5-8) from RRH2.

As a result, in this case, the UE may see the same set of beams in the same order repeatedly across all RRHs along the track, and each beam may cover (at least roughly) the same area. Assuming the UE speed does not vary too much within coverage of one RRH, the beam switch timing may be relatively predictable given the fixed locations of the RRHs, the RRH beam patterns, and known UE speed.

Aspects of the present disclosure propose signaling options and corresponding mechanisms for a UE to leverage these observations about RRHs in an HST deployment to enhance beam management and speed up the beam switching procedure in such HST scenarios. Those skilled in the art will recognize that the techniques proposed herein may be readily applied in similar scenarios, for example, where RRHs may be regularly deployed along a known route traversed by a UE.

To enhance beam management, the UE may need to know the mapping of the beams across different RRHs. In other words, the UE may need to know which beam from a current RRH is within the same direction as a beam from the next RRH, in order to explore the repetition pattern for beam management enhancement. The RRHs can be in the same or different (serving/nonserving) cells.

In some cases, the network may indicate different beam management reference signals on different RRHs that have the same or a similar/correlated quasi co-location (QCL) property (e.g., spatial relation information), such as a beam peak direction difference within x degrees. These beam management reference signals may include, for example, SSBs, Channel State Information Reference Signals (CSI-RS), or reference signals for radio resource management (RRM) measurement procedures. This information may be provided as assistance information to a UE (to assist the UE in performing beam management as it moves between RRHs).

For example, in some cases, the network can signal a mapping table, such as that shown in FIG. 4B, that provides a mapping between beams in adjacent RRHs. As illustrated, the table may indicate that beams 1-4 of RRH map to beams 5-8 or RRH.

Figure 5:
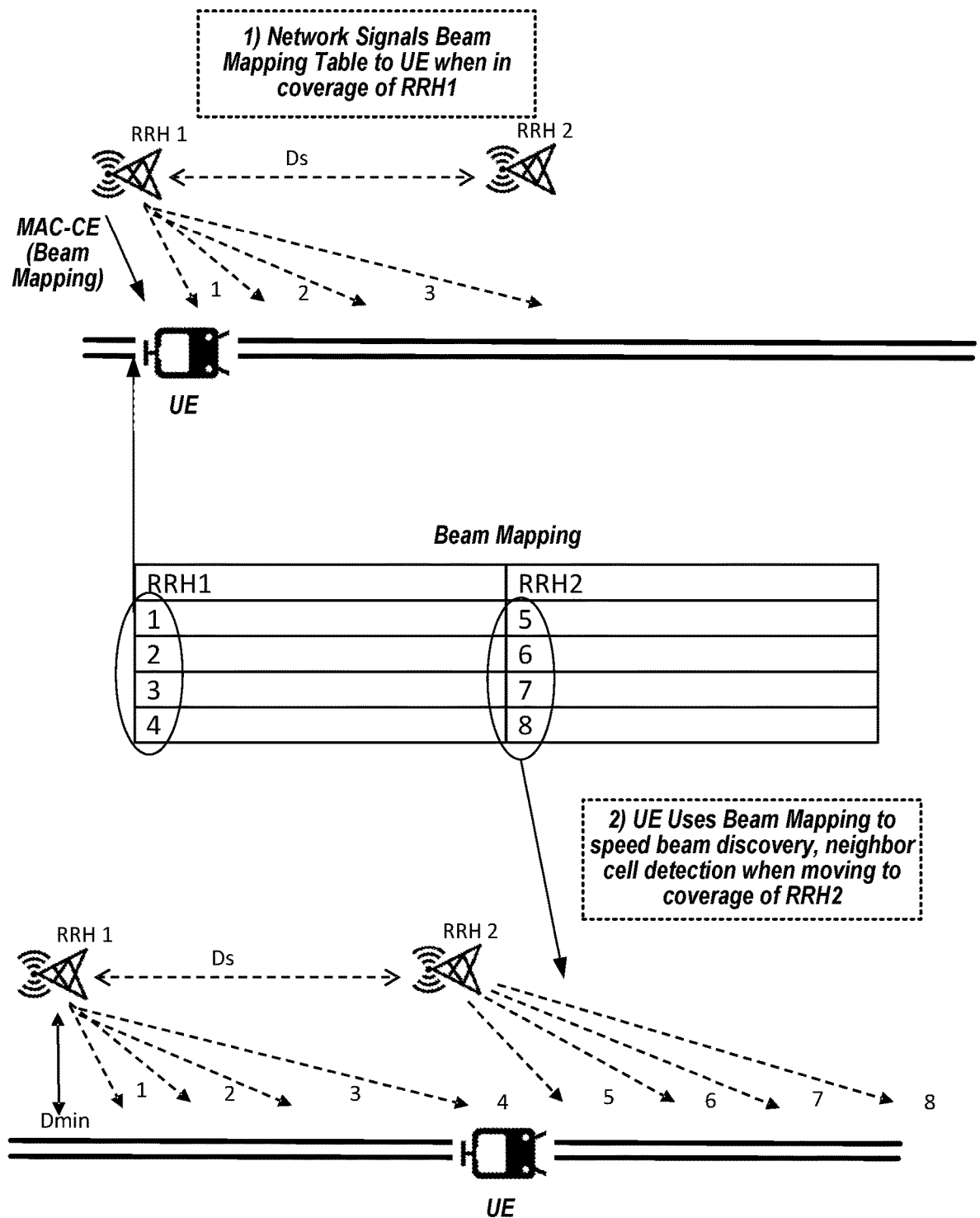
FIG. 5 depicts an example use of beam mapping information in an HST deployment, according to aspects of the present disclosure.

FIG. 5 illustrates how a UE may use assistance information, such as the RRH beam mapping information, to enhance beam management.

As illustrated, the network may signal the beam mapping table to the UE when UE is in the coverage of RRH1. The mapping can be signaled in the form of SSB indexes. Based on this information, the UE knows the approximate RRH beam directions from RRH2 (for beams 5-8) before entering RRH2 coverage area.

As illustrated, the beam mapping table indicates a first set of SSB indexes belonging to RRH1 and a second set of SSB indexes belonging to RRH2. This information may be useful to the UE, since SSBs belonging to RRH2 may have different propagation delays and Doppler shifts than SSBs belonging to RRH1. For example, the UE may take these differences into account when performing beam management when moving from the coverage area of RRH1 to the coverage area of RRH2.

As a result of obtaining this prior knowledge of the RRH2 beam pattern, when the UE enters the RRH2 coverage area, the UE may use the beam mapping to speed beam discovery, neighboring cell detection, beam refinement, and/or beam switching by reducing Rx beam sweeping delay. This enhancement may be important to enhance coverage and user experience for passengers on high speed trains.

In some cases, the network can signal additional information to the UE. For example, the additional information may include one or more of: a distance between the projections of adjacent beam peaks on the track, a beam peak direction angle relative to the track, and a projection (e.g., a 6 dB beam-width projection) on the track.

Figure 6:
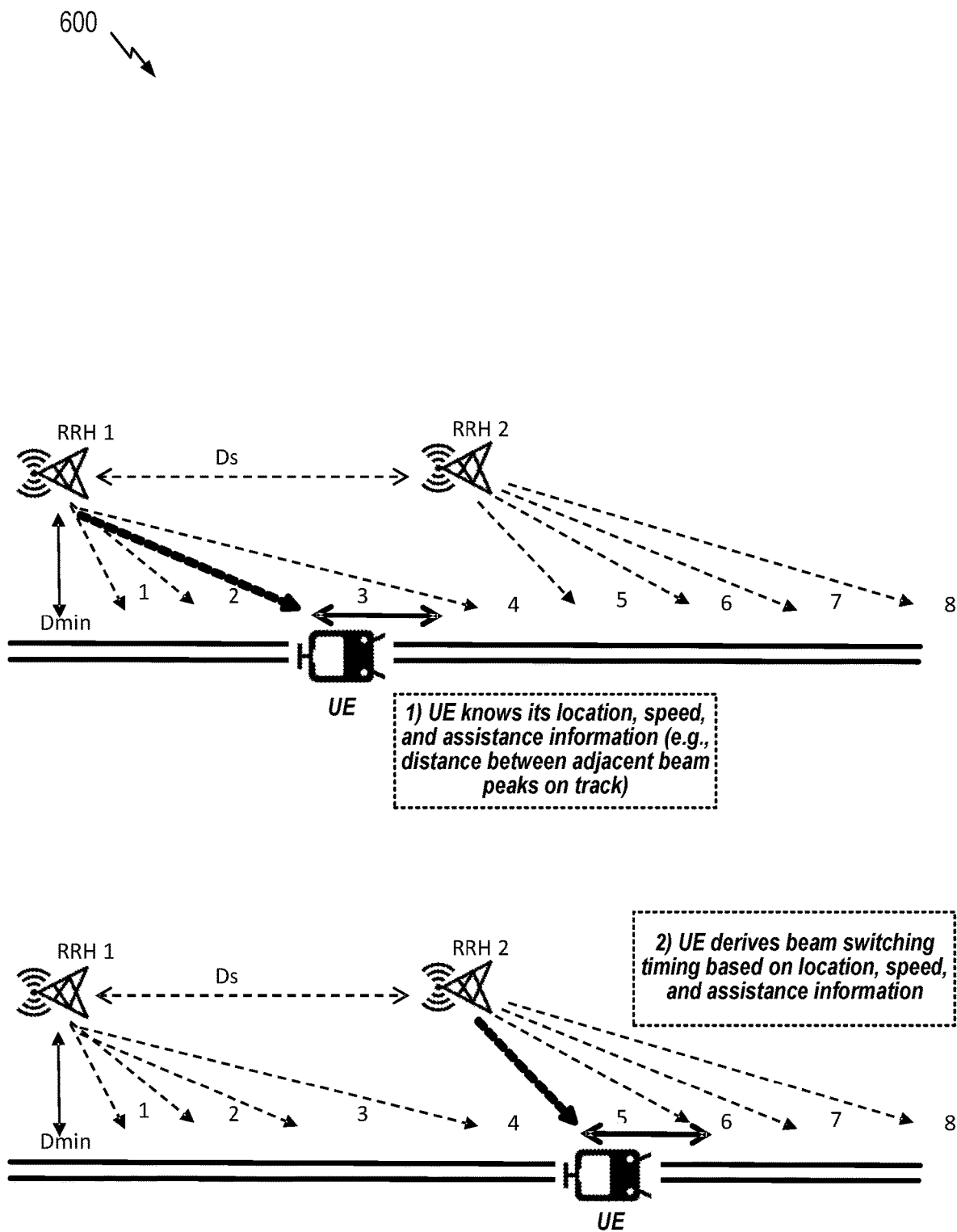
FIG. 6 depicts another example use of beam mapping information in an HST deployment, according to aspects of the present disclosure.

As illustrated in FIG. 6, a UE may use this additional information to determine beam switching timing as it moves along the track. For example, assuming the UE knows its location and speed, the UE can derive its beam switching timing, based on the above information provided by network to prepare for the beam switching. In the illustrated example, the UE may know how much time it takes to travel from a first position (under coverage of RRH1 via beam 3) to a second position (under coverage of RRH2 via beam 5), and can derive beam switching timing accordingly.

In some cases, the network can similarly derive beam switching timing based on UE speed. In such cases, the UE may signal its speed to the network. Using this approach, the network does not have to wait for a measurement report from the UE to switch TCI state (e.g., to select a new beam under RRH2).

As described above, aspects of the present disclosure propose additional network to UE assistant information, in addition to current beam management related signaling. As noted above, the network can indicate different SSBs (or other type beam management reference signals) on adjacent RRHs having the same (or similar) QCL property (spatial relation/beam information). In some cases, the network may signal the mapping between the repeated sets of beams from the adjacent RRHs.

The assistance information may also include other beam coverage related information, such as the distance between the projections of adjacent beam peaks on the track, beam peak direction angle relative to track, and beam-width projection on the track.

In some cases, an initial configuration can be signaled via radio resource control (RRC) signaling, and RRH beam mapping information may be updated dynamically, for example, signaled via a medium access control (MAC) control element (MAC-CE).

In some cases, the UE may also report assistance information to the network. For example, the UE may report to network its speed. Based on this information, and information regarding RRH beams, the network may be able to derive beam switching timing for the UE (rather than having to wait for a measurement report from the UE).

Example Methods

Figure 7:
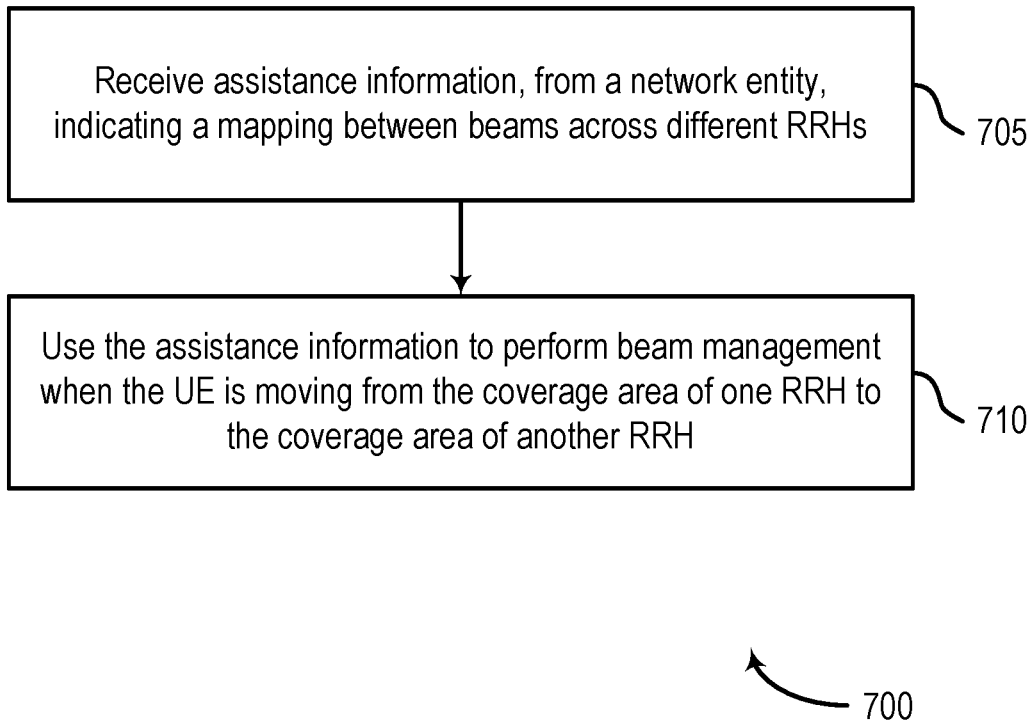
FIGS. 7 and 8 show example methods for using assistance information to perform beam management when a UE is moving between coverage areas of different remote radio heads (RRHs), according to aspects of the present disclosure.

FIG. 7 shows an example of a method 700 for using assistance information to perform beam management when a UE is moving between coverage areas of different RRHs, according to aspects of the present disclosure. In some aspects, a user equipment, such as UE 104 of FIGS. 1 and 2, or processing system 905 of FIG. 9, may perform the method 700.

At operation 705, the UE receives assistance information, from a network entity, indicating a mapping between beams across different RRHs. In some cases, the operations of this step refer to, or may be performed by, a beam mapping control circuitry as described with reference to FIG. 9.

At operation 710, the UE uses the assistance information to perform beam management when the UE is moving from the coverage area of one RRH to the coverage area of another RRH. In some cases, the operations of this step refer to, or may be performed by, a beam management circuitry as described with reference to FIG. 9.

In some aspects, at least some of the RRHs are in different cells.

In some aspects, the assistance information indicates a mapping between beams across different RRHs that have same or similar QCL receive spatial filter properties. In some aspects, the assistance information indicates beam management reference signals on different RRHs having the same or similar QCL properties. In some aspects, the beam management reference signals comprise at least one of SSBs, CSI-RS, or reference signals for RRM measurement procedures. In some aspects, the same or similar QCL properties comprise beam peak direction differences within a threshold value of degrees. In some aspects, the assistance information is provided as a mapping table indicating mappings of beams of a first RRH to beams of a second RRH. In some aspects, the information is conveyed to the UE by signaling an initial mapping configuration via a RRC message and signaling an update of the mapping in each RRH via a MAC-CE command.

In some aspects, using the assistance information to perform beam management comprises using the assistance information to reduce latency for at least one of beam discovery, neighboring cell detection, beam refinement, or beam switching.

In some aspects, the UE is located in or on a vehicle traveling a known route. In some aspects, the UE is located in or on a HST and the RRHs are deployed along a track on which the HST moves.

In some aspects, the method 700 includes receiving additional information comprising at least one of a distance between projections of adjacent beam peaks on the track, beam peak direction angles relative to track, or a beam-width projection on the track in which radiated power is within a threshold value.

In some aspects, the method 700 includes deriving beam switch timing based on the additional information.

In some aspects, the method 700 includes providing an indication of a speed at which the UE is traveling and receiving signaling for beam switching with switching timing derived based on the indicated speed.

In some aspects, the method 700 includes receiving signaling of an initial mapping configuration via a RRC message and receiving signaling of an update of the mapping in each RRH via a MAC-CE command.

Figure 8:
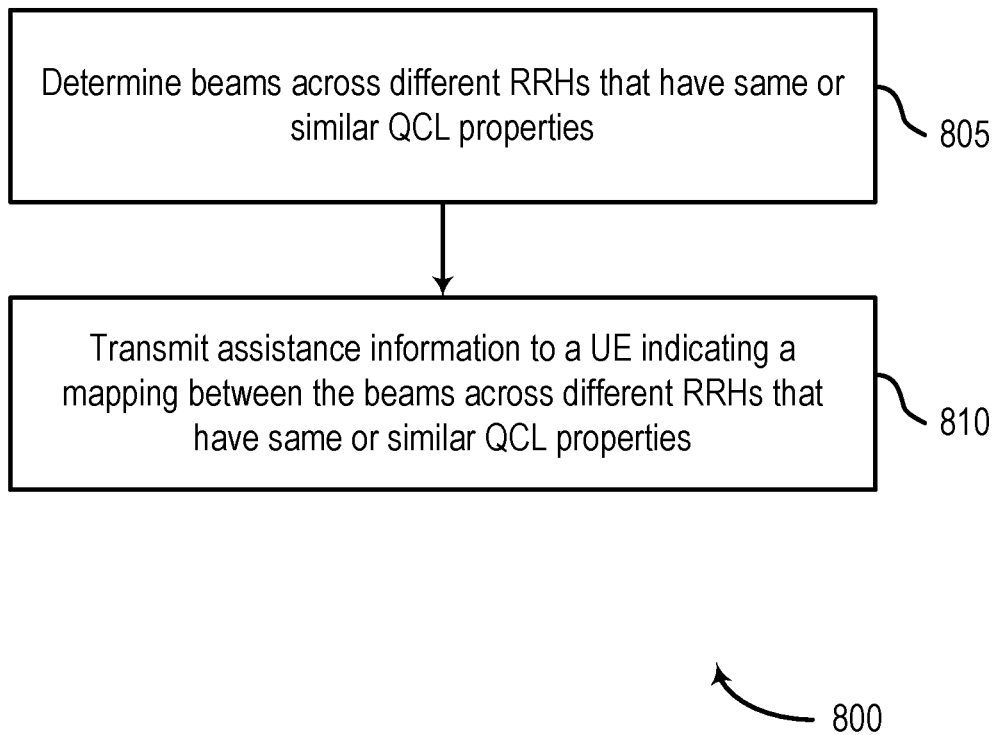

FIG. 8 shows an example of a method 800 that may be considered complementary to operations 700 of FIG. 7. For example, the method 800 may be performed by a network entity (e.g., a gNB) to configure a UE (performing operations 800 of FIG. 8) for using assistance as the UE moves between coverage areas of different RRHs according to aspects of the present disclosure. In some aspects, a base station, such as base station 102 of FIGS. 1 and 2, or processing system 1005 of FIG. 10, may perform the method 800.

At operation 805, the network entity determines beams across different RRHs that have same or similar QCL properties. In some cases, the operations of this step refer to, or may be performed by, a RRH beam mapping circuitry as described with reference to FIG. 10.

At operation 810, the network entity transmits assistance information to a UE indicating a mapping between the beams across different RRHs that have same or similar QCL properties. In some cases, the operations of this step refer to, or may be performed by, a UE beam management control circuitry as described with reference to FIG. 10.

In some aspects, at least some of the RRHs are in different cells.

In some aspects, the assistance information indicates a mapping between beams across different RRHs that have same or similar QCL receive spatial filter properties. In some aspects, the same or similar QCL properties comprise beam peak direction differences within a threshold value of degrees. In some aspects, the assistance information indicates beam management reference signals on different RRHs having the same or similar QCL properties. In some aspects, the beam management reference signals comprise at least one of SSBs, CSI-RS, or reference signals for RRM measurement procedures. In some aspects, the assistance information is provided as a mapping table indicating mappings of beams of a first RRH to beams of a second RRH. In some aspects, the network entity conveys the information to the UE by signaling an initial mapping configuration via a RRC message and signaling an update of the mapping in each RRH via a MAC-CE command.

In some aspects, the UE is located in or on a vehicle traveling a known route. In some aspects, the UE is located in or on a HST and the RRHs are deployed along a track on which the HST moves.

In some aspects, the method 800 includes transmitting, to the UE, additional information comprising at least one of a distance between projections of adjacent beam peaks on the track, beam peak direction angles relative to track, or a beam-width projection on the track in which radiated power is within a threshold value.

In some aspects, the method 800 includes receiving, from the UE, an indication of a speed at which the UE is traveling and transmitting, to the UE, signaling for beam switching with switching timing derived based on the indicated speed.

In some aspects, the method 800 includes signaling an initial mapping configuration via a RRC message and signaling an update of the mapping in each RRH via a MAC-CE command.

Example Wireless Communication Device

Figure 9:
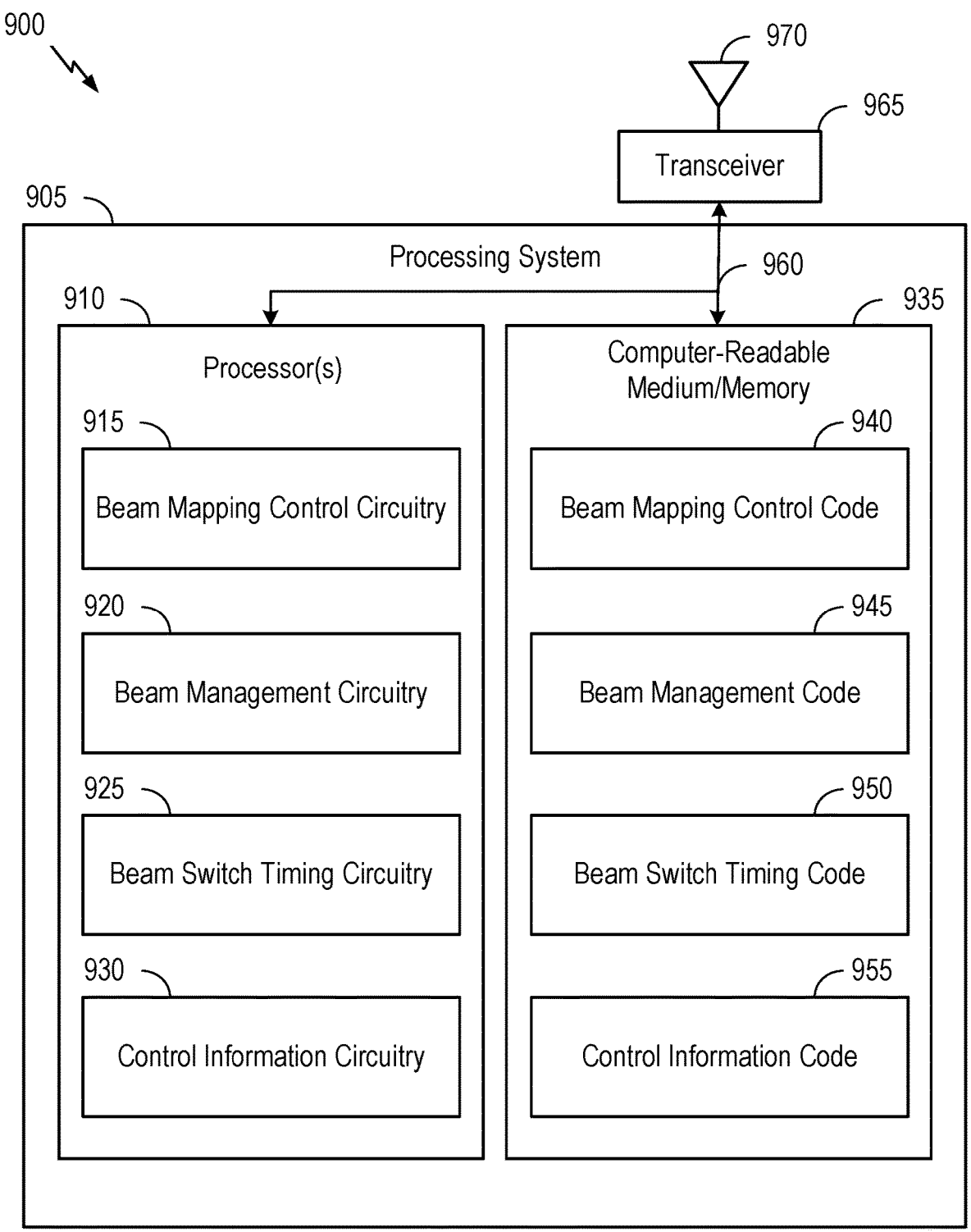
FIGS. 9 and 10 show examples of a communications device according to aspects of the present disclosure.

FIG. 9 depicts an example communications device 900 that includes various components operable, configured, or adapted to perform operations for the techniques disclosed herein, such as the operations depicted and described with respect to FIG. 7. In some examples, communication device may be a user equipment 104 as described, for example with respect to FIGS. 1 and 2.

Communications device 900 includes a processing system 905 coupled to a transceiver 965 (e.g., a transmitter and/or a receiver). Transceiver 965 is configured to transmit (or send) and receive signals for the communications device 900 via an antenna 970, such as the various signals as described herein. Processing system 905 may be configured to perform processing functions for communications device 900, including processing signals received and/or to be transmitted by communications device 900.

A transceiver 965 may communicate bi-directionally, via antennas 970, wired, or wireless links as described above. For example, the transceiver 965 may represent a wireless transceiver 965 and may communicate bi-directionally with another wireless transceiver 965. The transceiver 965 may also include or be connected to a modem to modulate the packets and provide the modulated packets to for transmission, and to demodulate received packets. In some examples, transceiver 965 may be tuned to operate at specified frequencies. For example, a modem can configure the transceiver 965 to operate at a specified frequency and power level based on the communication protocol used by the modem.

Processing system 905 includes one or more processors 910 coupled to a computer-readable medium/memory 935 via a bus 960. In certain aspects, computer-readable medium/memory 935 is configured to store instructions (e.g., computer-executable code) that when executed by the one or more processors 910, cause the one or more processors 910 to perform the operations illustrated in FIG. 7, or other operations for performing the various techniques discussed herein.

Various components of communications device 900 may provide means for performing the methods described herein, including with respect to FIG. 7.

Figure 2:
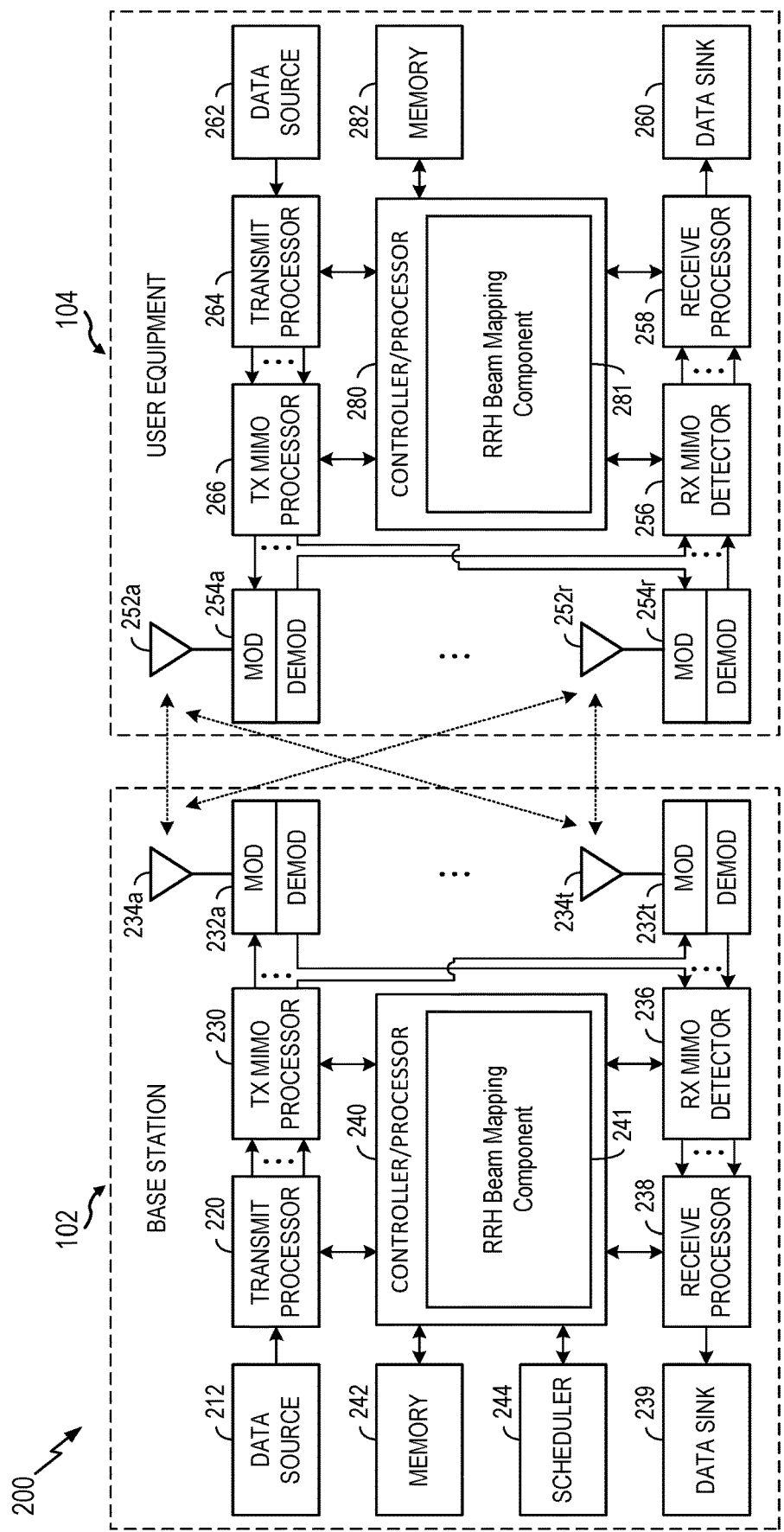
FIG. 2 is a block diagram conceptually illustrating aspects of an example a base station and user equipment.

In some examples, means for transmitting or sending (or means for outputting for transmission) may include the transceivers 254 and/or antenna(s) 252 of the user equipment 104 illustrated in FIG. 2 and/or transceiver 965 and antenna 970 of the communication device in FIG. 9.

In some examples, means for receiving (or means for obtaining) may include the transceivers 254 and/or antenna (s) 252 of the user equipment 104 illustrated in FIG. 2 and/or transceiver 965 and antenna 970 of the communication device in FIG. 9.

In some examples, means for using and/or means for deriving may include various processing system 905 components, such as: the one or more processors 910 in FIG. 9, or aspects of the user equipment 104 depicted in FIG. 2, including receive processor 258, transmit processor 264, TX MIMO processor 266, and/or controller/processor 280.

In some examples, one or more processors 910 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 910 are configured to operate a memory array using a memory controller. In other cases, a memory controller is integrated into the one or more processors 910. In some cases, the one or more processors 910 are configured to execute computer-readable instructions stored in a memory to perform various functions. In some aspects, one or more processors 910 include special purpose components for modem processing, baseband processing, digital signal processing, or transmission processing.

In one aspect, one or more processors 910 includes beam mapping control circuitry 915, beam management circuitry 920, beam switch timing circuitry 925, and control information circuitry 930.

According to some aspects, beam mapping control circuitry 915 receives assistance information, from a network entity, indicating a mapping between beams across different RRHs. In some examples, at least some of the RRHs are in different cells. In some examples, the assistance information indicates a mapping between beams across different RRHs that have same or similar QCL receive spatial filter properties. In some examples, the assistance information indicates beam management reference signals on different RRHs having the same or similar QCL properties. In some examples, the beam management reference signals include at least one of SSBs, CSI-RS, or reference signals for RRM measurement procedures. In some examples, the same or similar QCL properties include beam peak direction differences within a threshold value of degrees. In some examples, the assistance information is provided as a mapping table indicating mappings of beams of a first RRH to beams of a second RRH. In some aspects, the information is conveyed to the UE by signaling an initial mapping configuration via a RRC message and signaling an update of the mapping in each RRH via a MAC-CE command.

According to some aspects, beam management circuitry 920 uses the assistance information to perform beam management when the UE is moving from the coverage area of one RRH to the coverage area of another RRH. In some examples, the uses of the assistance information to perform beam management includes using the assistance information to reduce latency for at least one of beam discovery, neighboring cell detection, beam refinement, or beam switching. In some examples, the UE is located in or on a vehicle traveling a known route. In some examples, the UE is located in or on a HST and the RRHs are deployed along a track on which the HST moves.

According to some aspects, beam switch timing circuitry 925 receives additional information including at least one of a distance between projections of adjacent beam peaks on the track, beam peak direction angles relative to track, or a beam-width projection on the track in which radiated power is within a threshold value. In some examples, beam switch timing circuitry 925 derives beam switch timing based on the additional information. In some examples, beam switch timing circuitry 925 provides an indication of a speed at which the UE is traveling. In some examples, beam switch timing circuitry 925 receives signaling for beam switching with switching timing derived based on the indicated speed.

According to some aspects, control information circuitry 930 receives signaling of an initial mapping configuration via a RRC message. In some examples, control information circuitry 930 receives signals of an update of the mapping in each RRH via a MAC-CE command.

In one aspect, computer-readable medium/memory 935 includes (e.g., stores) beam mapping control code 940, beam management code 945, beam switch timing code 950, and control information code 955.

Examples of computer-readable medium/memory 935 include random access memory (RAM), read-only memory (ROM), or a hard disk. Examples of memory devices include solid state memory and a hard disk drive. In some examples, computer-readable medium/memory 935 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Notably, FIG. 9 is just use example, and many other examples and configurations of communication device are possible.

Figure 10:
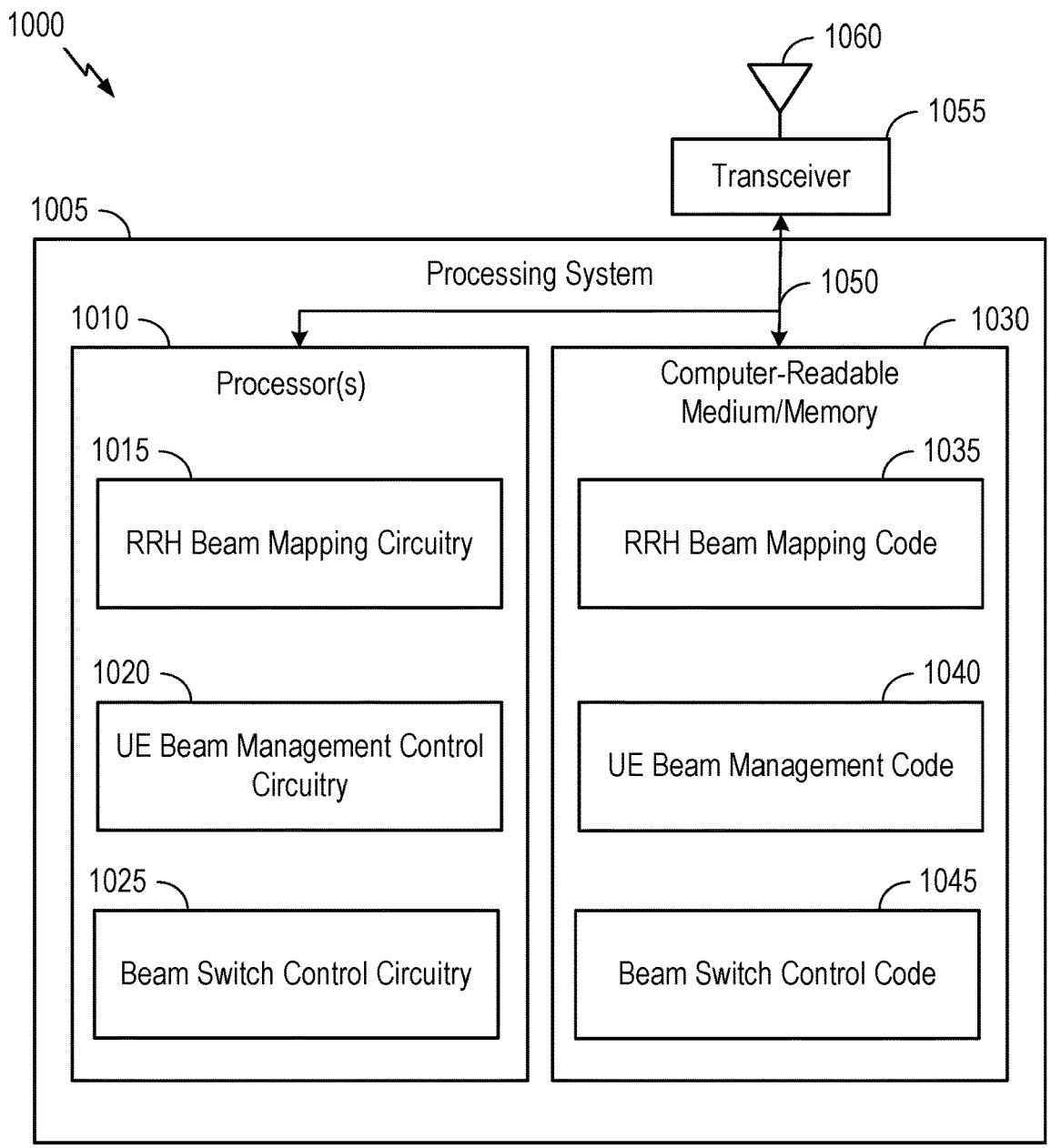

FIG. 10 depicts an example communications device 1000 that includes various components operable, configured, or adapted to perform operations for the techniques disclosed herein, such as the operations depicted and described with respect to FIG. 8. In some examples, communication device may be a base station 102 as described, for example with respect to FIGS. 1 and 2.

Communications device 1000 includes a processing system 1005 coupled to a transceiver 1055 (e.g., a transmitter and/or a receiver). Transceiver 1055 is configured to transmit (or send) and receive signals for the communications device 1000 via an antenna 1060, such as the various signals as described herein. Processing system 1005 may be configured to perform processing functions for communications device 1000, including processing signals received and/or to be transmitted by communications device 1000.

Processing system 1005 includes one or more processors 1010 coupled to a computer-readable medium/memory 1030 via a bus 1050. In certain aspects, computer-readable medium/memory 1030 is configured to store instructions (e.g., computer-executable code) that when executed by the one or more processors 1010, cause the one or more processors 1010 to perform the operations illustrated in FIG. 8, or other operations for performing the various techniques discussed herein.

Various components of communications device 1000 may provide means for performing the methods described herein, including with respect to FIG. 8.

In some examples, means for transmitting or sending (or means for outputting for transmission) may include the transceivers 232 and/or antenna(s) 234 of the base station 102 illustrated in FIG. 2 and/or transceiver 1055 and antenna 1060 of the communication device in FIG. 10.

In some examples, means for receiving (or means for obtaining) may include the transceivers 232 and/or antenna(s) 234 of the base station illustrated in FIG. 2 and/or transceiver 1055 and antenna 1060 of the communication device in FIG. 10.

In some examples, means for determining may include various processing system 1005 components, such as: the one or more processors 1010 in FIG. 10, or aspects of the base station 102 depicted in FIG. 2, including receive processor 238, transmit processor 220, TX MIMO processor 230, and/or controller/processor 240.

In one aspect, one or more processors 1010 includes RRH beam mapping circuitry 1015, UE beam management control circuitry 1020, and beam switch control circuitry 1025. In some examples, one or more processors 1010 are examples of, or include aspects of, the corresponding element described with reference to FIG. 9.

According to some aspects, RRH beam mapping circuitry 1015 determines beams across different RRHs that have same or similar QCL properties. In some examples, at least some of the RRHs are in different cells.

According to some aspects, UE beam management control circuitry 1020 transmits assistance information to a UE indicating a mapping between the beams across different RRHs that have same or similar QCL properties. In some examples, the assistance information indicates a mapping between beams across different RRHs that have same or similar QCL receive spatial filter properties. In some examples, the same or similar QCL properties include beam peak direction differences within a threshold value of degrees. In some examples, the assistance information indicates beam management reference signals on different RRHs having the same or similar QCL properties. In some examples, the beam management reference signals include at least one of SSBs, CSI-RS, or reference signals for RRM measurement procedures. In some examples, the assistance information is provided as a mapping table indicating mappings of beams of a first RRH to beams of a second RRH. In some examples, the UE is located in or on a vehicle traveling a known route. In some examples, the UE is located in or on a HST and the RRHs are deployed along a track on which the HST moves. In some examples, UE beam management control circuitry 1020 signals an initial mapping configuration via a RRC message. In some examples, UE beam management control circuitry 1020 signals an update of the mapping in each RRH via a MAC-CE command.

According to some aspects, beam switch control circuitry 1025 transmits the UE additional information including at least one of a distance between projections of adjacent beam peaks on the track, beam peak direction angles relative to track, or a beam-width projection on the track in which radiated power is within a threshold value. In some examples, beam switch control circuitry 1025 receives, from the UE, an indication of a speed at which the UE is traveling. In some examples, beam switch control circuitry 1025 transmits the UE signaling for beam switching with switching timing derived based on the indicated speed.

In one aspect, computer-readable medium/memory 1030 includes (e.g., stores) RRH beam mapping code 1035, UE beam management code 1040, and beam switch control code 1045. In some examples, computer-readable medium/memory 1030 is an example of, or includes aspects of, the corresponding element described with reference to FIG. 9.

Notably, FIG. 10 is just use example, and many other examples and configurations of communication device are possible.

Example Clauses

Implementation examples are described in the following numbered clauses:

Clause 1: A method for wireless communications by a UE, comprising: receiving assistance information, from a network entity, indicating a mapping between beams across different RRHs; and using the assistance information to perform beam management when the UE is moving from the coverage area of one RRH to the coverage area of another RRH.

Clause 2: The method of Clause 1, wherein: at least some of the RRHs are in different cells.

Clause 3: The method of any one of Clauses 1 and 2, wherein: the assistance information indicates a mapping between beams across different RRHs that have same or similar QCL receive spatial filter properties.

Clause 4: The method of Clause 3, wherein: the assistance information indicates beam management reference signals on different RRHs having the same or similar QCL properties.

Clause 5: The method of Clause 4, wherein: the beam management reference signals comprise at least one of SSBs, CSI-RS, or reference signals for RRM measurement procedures.

Clause 6: The method of Clause 3, wherein: the same or similar QCL properties comprise beam peak direction differences within a threshold value of degrees.

Clause 7: The method of any one of Clauses 1-6, wherein: the assistance information is provided as a mapping table indicating mappings of beams of a first RRH to beams of a second RRH.

Clause 8: The method of any one of Clauses 1-7, wherein: using the assistance information to perform beam management comprises using the assistance information to reduce latency for at least one of: beam discovery, neighboring cell detection, beam refinement, or beam switching.

Clause 9: The method of any one of Clauses 1-8, wherein: the UE is located in or on a vehicle traveling a known route.

Clause 10: The method of Clause 9, wherein: the UE is located in or on a high speed train (HST) and the RRHs are deployed along a track on which the HST moves.

Clause 11: The method of Clause 10, further comprising: receiving additional information comprising at least one of: a distance between projections of adjacent beam peaks on the track, beam peak direction angles relative to track, or a beam-width projection on the track in which radiated power is within a threshold value.

Clause 12: The method of Clause 11, further comprising: deriving beam switch timing based on the additional information.

Clause 13: The method of any one of Clauses 1-12, further comprising: providing an indication of a speed at which the UE is traveling; and receiving signaling for beam switching with switching timing derived based on the indicated speed.

Clause 14: The method of any one of Clauses 1-13, wherein: the information is conveyed to the UE by signaling an initial mapping configuration via a RRC message and signaling an update of the mapping in each RRH via a MAC-CE command.

Clause 15: A method for wireless communications by a network entity, comprising: determining beams across different RRHs that have same or similar QCL properties; and transmitting assistance information to a UE indicating a mapping between the beams across different RRHs that have same or similar QCL properties.

Clause 16: The method of Clause 15, wherein: at least some of the RRHs are in different cells.

Clause 17: The method of any one of Clauses 15 and 16, wherein: the assistance information indicates a mapping between beams across different RRHs that have same or similar QCL receive spatial filter properties.

Clause 18: The method of any one of Clauses 15-17, wherein: the assistance information indicates beam management reference signals on different RRHs having the same or similar QCL properties.

Clause 19: The method of Clause 18, wherein: the beam management reference signals comprise at least one of SSBs, CSI-RS, or reference signals for RRM measurement procedures.

Clause 20: The method of Clause 17, wherein: the same or similar QCL properties comprise beam peak direction differences within a threshold value of degrees.

Clause 21: The method of any one of Clauses 15-20, wherein: the assistance information is provided as a mapping table indicating mappings of beams of a first RRH to beams of a second RRH.

Clause 22: The method of any one of Clauses 15-21, wherein: the UE is located in or on a vehicle traveling a known route.

Clause 23: The method of Clause 22, wherein: the UE is located in or on a high speed train (HST) and the RRHs are deployed along a track on which the HST moves.

Clause 24: The method of Clause 23, further comprising: transmitting, to the UE, additional information comprising at least one of: a distance between projections of adjacent beam peaks on the track, beam peak direction angles relative to track, or a beam-width projection on the track in which radiated power is within a threshold value.

Clause 25: The method of any one of Clauses 15-24, further comprising: receiving, from the UE, an indication of a speed at which the UE is traveling; and transmitting, to the UE, signaling for beam switching with switching timing derived based on the indicated speed.

Clause 26: The method of any one of Clauses 15-25, wherein: the network entity conveys the information to the UE by: signaling an initial mapping configuration via a RRC message; and signaling an update of the mapping in each RRH via a MAC-CE command.

Clause 27: A processing system, comprising: a memory comprising computer-executable instructions; one or more processors configured to execute the computer-executable instructions and cause the processing system to perform a method in accordance with any one of Clauses 1-26.

Clause 28: A processing system, comprising means for performing a method in accordance with any one of Clauses 1-26.

Clause 29: A non-transitory computer-readable medium comprising computer-executable instructions that, when executed by one or more processors of a processing system, cause the processing system to perform a method in accordance with any one of Clauses 1-26.

Clause 30: A computer program product embodied on a computer-readable storage medium comprising code for performing a method in accordance with any one of Clauses 1-26.

Clause 31: The method of any one of Clauses 1-15, wherein the assistance information indicates a first set of beam indexes that belong to a first RRH and a second set of beam indexes that belong to a second RRH.

Clause 32: The method of any one of Clauses 15-25, wherein the assistance information indicates a first set of beam indexes that belong to a first RRH and a second set of beam indexes that belong to a second RRH.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu \times 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 3A-3D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIGs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of techniques for using assistance information to enhance beam management as a UE moves between coverage areas of adjacent Remote Radio Heads (RRHs). The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communications at a user equipment (UE), comprising:
   one or more memories comprising instructions; and
   one or more processors configured to execute the instructions and cause the apparatus to:
   receive assistance information, from a network entity, indicating a mapping between beams across different remote radio heads (RRHs), wherein the mapping indicates one or more beams from a first RRH within a same direction as one or more beams from a second RRH, and wherein the assistance information further indicates additional information comprising a distance between projections of adjacent beam peaks; and use the assistance information to perform beam management when the UE is moving from a coverage area of one RRH to a coverage area of another RRH.

2. The apparatus of claim 1, wherein at least some of the RRHs are in different cells.

3. The apparatus of claim 1, wherein the assistance information indicates a first set of beam indexes that belong to the first RRH and a second set of beam indexes that belong to the second RRH.

4. The apparatus of claim 1, wherein the assistance information indicates the mapping between the beams across the different RRHs that have same or similar quasi co-location (QCL) receive spatial filter properties.

5. The apparatus of claim 4, wherein the assistance information indicates beam management reference signals on the different RRHs having the same or similar QCL receive spatial filter properties.

6. The apparatus of claim 5, wherein the beam management reference signals comprise at least one of synchronization signal blocks (SSBs), Channel State Information Reference Signals (CSI-RS), or reference signals for radio resource management (RRM) measurement procedures.

7. The apparatus of claim 4, wherein the same or similar QCL receive spatial filter properties comprise beam peak direction differences within a threshold value of degrees.

8. The apparatus of claim 1, wherein the assistance information is provided as a mapping table indicating mappings of beams of the first RRH to beams of the second RRH.

9. The apparatus of claim 1, wherein the one or more processors are configured to execute the instructions and cause the apparatus to use the assistance information to reduce latency for at least one of: beam discovery, neighboring cell detection, beam refinement, or beam switching.

10. The apparatus of claim 1, wherein the UE is located in or on a vehicle traveling a known route.

11. The apparatus of claim 10, wherein the UE is located in or on a high speed train (HST) and the RRHs are deployed along a track on which the HST moves.

12. The apparatus of claim 11, wherein the one or more processors are configured to execute the instructions and cause the apparatus to receive the additional information further comprising beam peak direction angles relative to the track and a beam-width projection on the track in which radiated power is within a threshold value.

13. The apparatus of claim 1, wherein the one or more processors are configured to execute the instructions and cause the apparatus to derive beam switch timing based on the additional information.

14. The apparatus of claim 1, wherein the one or more processors are configured to execute the instructions and cause the apparatus to:
provide an indication of a speed at which the UE is traveling; and
receive signaling for beam switching with switching timing derived based on the indicated speed.

15. The apparatus of claim 1, wherein the one or more processors are configured to execute the instructions and cause the apparatus to receive the assistance information:
via a radio resource control (RRC) message signaling an initial mapping configuration; and
via a medium access control (MAC) control element (MAC-CE) command signaling an update of the mapping in each RRH.

16. An apparatus for wireless communications at a network entity, comprising:
one or more memories comprising instructions; and
one or more processors configured to execute the instructions and cause the apparatus to:
determine beams across different remote radio heads (RRHs) that have same or similar quasi co-location (QCL) properties; and
transmit assistance information to a user equipment (UE) indicating a mapping between beams across the different RRHs that have same or similar QCL properties, wherein the mapping indicates one or more beams from a first RRH within a same direction as one or more beams from a second RRH, and wherein the assistance information further indicates additional information comprising a distance between projections of adjacent beam peaks.

17. The apparatus of claim 16, wherein at least some of the RRHs are in different cells.

18. The apparatus of claim 16, wherein the assistance information indicates a first set of beam indexes that belong to the first RRH and a second set of beam indexes that belong to a second RRH.

19. The apparatus of claim 16, wherein the assistance information indicates the mapping between the beams across the different RRHs that have same or similar quasi co-location (QCL) receive spatial filter properties.

20. The apparatus of claim 16, wherein the assistance information indicates beam management reference signals on the different RRHs having the same or similar QCL receive spatial filter properties.

21. The apparatus of claim 20, wherein the beam management reference signals comprise at least one of synchronization signal blocks (SSBs), Channel State Information Reference Signals (CSI-RS), or reference signals for radio resource management (RRM) measurement procedures.

22. The apparatus of claim 19, wherein the same or similar QCL receive spatial filter properties comprise beam peak direction differences within a threshold value of degrees.

23. The apparatus of claim 16, wherein the assistance information is provided as a mapping table indicating mappings of beams of the first RRH to beams of the second RRH.

24. The apparatus of claim 16, wherein the UE is located in or on a vehicle traveling a known route.

25. The apparatus of claim 24, wherein the UE is located in or on a high speed train (HST) and the RRHs are deployed along a track on which the HST moves.

26. The apparatus of claim 25, wherein the one or more processors are configured to execute the instructions and cause the apparatus to transmit, to the UE, the additional information further comprising beam peak direction angles relative to the track and a beam-width projection on the track in which radiated power is within a threshold value.

27. The apparatus of claim 16, wherein the one or more processors are configured to execute the instructions and cause the apparatus to:
receive, from the UE, an indication of a speed at which the UE is traveling; and
transmit, to the UE, signaling for beam switching with switching timing derived based on the indicated speed.

28. The apparatus of claim 16, wherein the one or more processors are configured to execute the instructions and cause the apparatus to transmit the assistance information:
via a radio resource control (RRC) message signaling an initial mapping configuration; and via a medium access control (MAC) control element (MAC-CE) command signaling an update of the mapping in each RRH.

29. A method for wireless communications at a user equipment (UE), comprising:
receiving assistance information, from a network entity, indicating a mapping between beams across different remote radio heads (RRHs), wherein the mapping indicates one or more beams from a first RRH within a same direction as one or more beams from a second RRH, and wherein the assistance information further indicates additional information comprising a distance between projections of adjacent beam peaks; and
using the assistance information to perform beam management when the UE is moving from a coverage area of one RRH to a coverage area of another RRH.

30. A method for wireless communications at a network entity, comprising:
determining beams across different remote radio heads (RRHs) that have same or similar quasi co-location (QCL) properties; and
transmitting assistance information to a user equipment (UE) indicating a mapping between the beams across the different RRHs that have same or similar QCL properties, wherein the mapping indicates one or more beams from a first RRH within a same direction as one or more beams from a second RRH, and wherein the assistance information further indicates additional information comprising a distance between projections of adjacent beam peaks.

* * * * *